(12) United States Patent
Fairfield et al.

(10) Patent No.: US 8,995,721 B1
(45) Date of Patent: Mar. 31, 2015

(54) USING OBJECT APPEARANCE CHANGES DUE TO HIGH REFLECTIVITY FOR FEATURE DETECTION

(71) Applicant: Google Inc., Mountain View, CA (US)

(72) Inventors: Nathaniel Fairfield, Mountain View, CA (US); Dave Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 13/759,033

(22) Filed: Feb. 4, 2013

(51) Int. Cl.
*G06K 9/00* (2006.01)
*G08G 1/123* (2006.01)

(52) U.S. Cl.
CPC .................................. *G06K 9/00791* (2013.01)
USPC ............................ 382/103; 382/291; 340/988

(58) Field of Classification Search
USPC ......... 382/100, 103–107, 155, 162, 168, 173, 382/181, 193–194, 199, 209, 224, 232, 254, 382/274, 276, 286–295, 305, 312; 348/148, 348/990, 988; 701/36, 1
See application file for complete search history.

(56) References Cited

U.S. PATENT DOCUMENTS

| | | | |
|---|---|---|---|
| 7,079,974 | B2 | 7/2006 | Remillard et al. |
| 7,983,802 | B2 * | 7/2011 | Breed .................................. 701/1 |
| 8,593,521 | B2 * | 11/2013 | Schofield et al. ............. 348/148 |
| 2009/0140887 | A1 * | 6/2009 | Breed et al. .................... 340/990 |
| 2010/0172542 | A1 * | 7/2010 | Stein et al. ..................... 382/103 |
| 2012/0050074 | A1 * | 3/2012 | Bechtel et al. ................ 340/988 |
| 2012/0123638 | A1 * | 5/2012 | Bechtel et al. .................. 701/36 |

OTHER PUBLICATIONS

A. Gonzalez et al., "Automatic Traffic Signs and Panels Inspection System Using Computer Vision", IEEE Transactions on Intelligent Transportation Systems, Jun. 2011, pp. 485-499, vol. 12, Issue 2, IEEE.

* cited by examiner

*Primary Examiner* — Seyed Azarian
(74) *Attorney, Agent, or Firm* — McDonnell Boehnen Hulbert & Berghoff LLP

(57) ABSTRACT

Methods and apparatus are disclosed related to classifying illuminated objects. A computing device can receive a sequence of images including first and second images. The first image can be of an environment of a vehicle taken at a first time. The second image can be of the environment of the vehicle taken at a second time. The vehicle can include a light source that illuminates a portion of the environment. The first and second times can differ. The computing device can detect an object having a first size and a first brightness in the first image. The computing device can detect the object having a second size and a second brightness in the second image. The computing device can classify the object based on a brightness difference between the first brightness and second brightness and a size difference between the first size and second size.

23 Claims, 10 Drawing Sheets

┌─ 110
│ Receiving, by a computing device, a sequence of images including a
│ first image and a second image, where the first image is taken at a
│ first time of an environment of a vehicle, where the second image is
│ taken at a second time of the environment of the vehicle, where the
│ vehicle includes a light source operable to illuminate at least a
│ portion of the environment, and where the first time is different from
│ the second time ┌─ 120
│ Detecting, by the computing device, an object in the first image,
│ where the object has a first size and a first brightness in the first
│ image ┌─ 130
│ Detecting, by the computing device, the object in the second image,
│ where the object has a second size and a second brightness in the
│ second image ┌─ 140
│ Classifying the object, by the computing device, based on at least a
│ brightness difference between the second brightness of the object
│ and the first brightness of the object and a size difference between
│ the second size of the object and the first size of the object.

FIG. 1

USING OBJECT APPEARANCE CHANGES DUE TO HIGH REFLECTIVITY FOR FEATURE DETECTION

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such an autonomous vehicle (AV) typically includes one or more sensors that are configured to sense information about the environment. The AV can use the sensed information to navigate through the environment. For example, if the sensors sense that the AV is approaching an obstacle, the vehicle can navigate around the obstacle. The AV can operate in various weather and lighting conditions, such as, but not limited to, days, nights, good visibility conditions, and/or reduced visibility conditions.

SUMMARY

In a first aspect, a method is provided. A computing device receives a sequence of images including a first image and a second image. The first image is taken at a first time of an environment of a vehicle. The second image is taken at a second time of the environment of the vehicle. The vehicle includes a light source operable to illuminate at least a portion of the environment. The first time is different from the second time. The computing device detects an object in the first image. The object has a first size and a first brightness in the first image. The computing device detects the object in the second image. The object has a second size and a second brightness in the second image. The computing device classifies the object based on at least a brightness difference between the second brightness of the object and the first brightness of the object and a size difference between the second size of the object and the first size of the object.

In another aspect, a device is provided. The device includes a computer-readable storage medium having stored thereon program instructions that, upon execution by a computing device, cause the computing device to perform operations. The operations include: receiving a sequence of images including a first image and a second image, where the first image is taken at a first time of an environment of a vehicle, where the second image is taken at a second time of the environment of the vehicle, where the vehicle includes a light source operable to illuminate at least a portion of the environment, and where the first time is different from the second time; detecting an object in the first image, where the object has a first size and a first brightness in the first image; detecting the object in the second image, where the object has a second size and a second brightness in the second image; and classifying the object based on at least a brightness difference between the second brightness of the object and the first brightness of the object and a size difference between the second size of the object and the first size of the object.

In yet another aspect, a computing device is provided. The computing device includes a processor and a non-transitory computer-readable storage medium. The non-transitory computer-readable storage medium stores instructions thereon that, when executed by the processor, cause the computing device to perform operations. The operations include: receiving a sequence of images including a first image and a second image, where the first image is taken at a first time of an environment of a vehicle, where the second image is taken at a second time of the environment of the vehicle, where the vehicle includes a light source operable to illuminate at least a portion of the environment, and where the first time is different from the second time; detecting an object in the first image, where the object has a first size and a first brightness in the first image; detecting the object in the second image, where the object has a second size and a second brightness in the second image; and classifying the object based on at least a brightness difference between the second brightness of the object and the first brightness of the object and/or a size difference between the second size of the object and the first size of the object.

The foregoing summary is illustrative only and is not intended to be in any way limiting. In addition to the illustrative aspects, appearances, embodiments, and features described above, further aspects, appearances, embodiments, and features will become apparent by reference to the figures and the following detailed description.

BRIEF DESCRIPTION OF THE DRAWINGS

FIG. 1 is a flow chart of an example method, according to an example embodiment.

DETAILED DESCRIPTION

Overview

Figure 2:
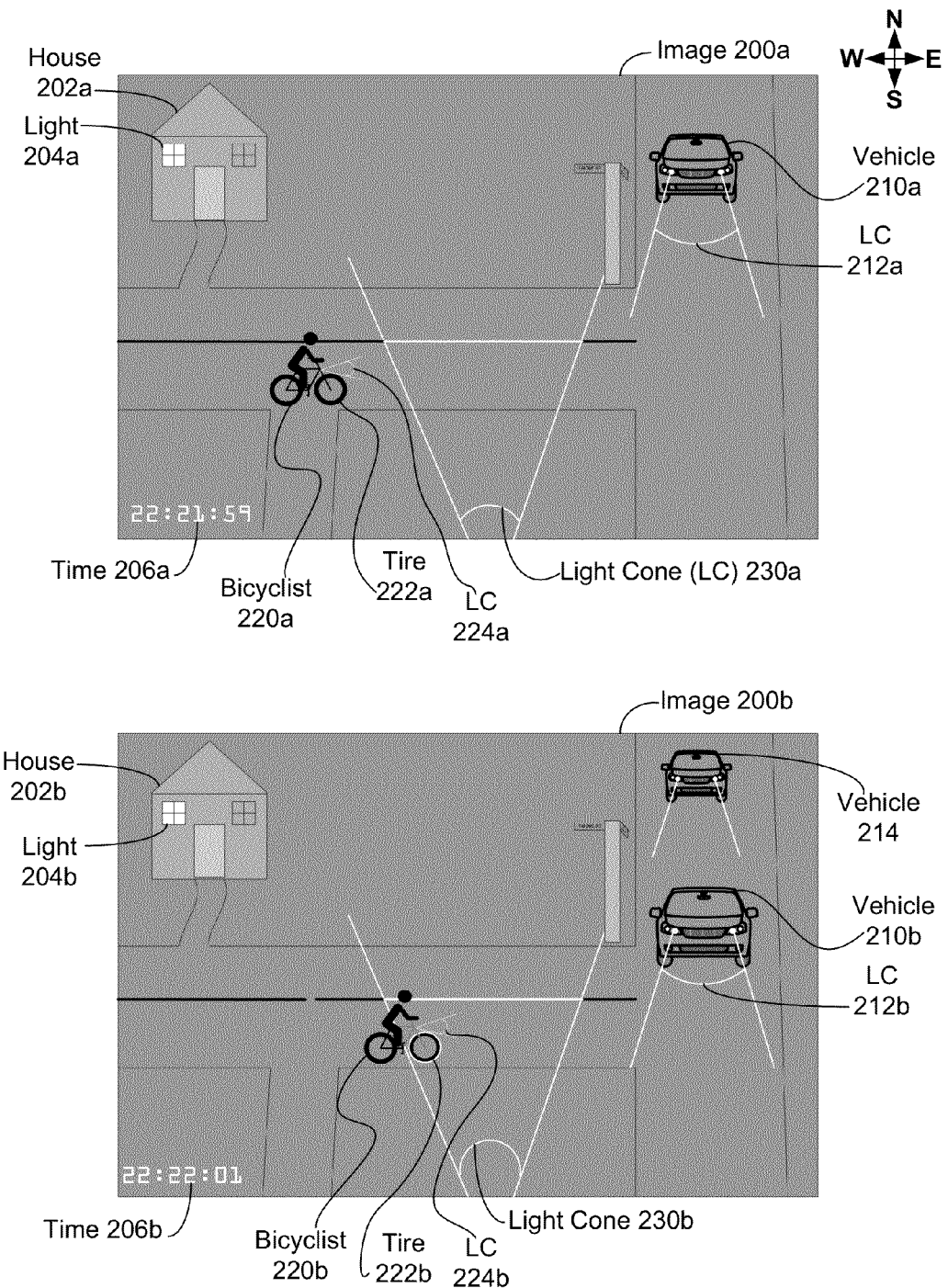
FIG. 2 shows example images taken by a stationary camera, according to an example embodiment.

Driving an autonomous vehicle (AV) at night presents various challenges compared to driving during daytime hours. One challenge is locating and evaluating traffic signs. Traffic signs can carry important information, such as speed limits, no passing zones, stopping locations, and directional information. At night, traffic signs can be more difficult to find and read, as color, shape, and other information about the signs can be diminished due to the lack of illumination at night.

Traffic signs are often configured with highly reflective surfaces that can become highly visible when appropriately illuminated. At night, these reflective surfaces can change appearance dramatically depending on whether they are illuminated by a light source associated with a vehicle, such as the vehicle's headlights, or by another light source. By considering how an object changes appearance as the light source passes by the object, the object can be classified as a passive light source (reflective object), such as a passively illuminated traffic sign, or an active illumination source, like brake lights, other headlights or street lights.

The light source can generate light within an illumination boundary. The light can be emitted in the visible spectrum or the non-visible spectrum, such as ultraviolet or infrared. The light source can be strobed, or cycled from active/on to inactive/off, at a frequency high enough not to be readily detected by the human eye; e.g., 60 Hz or above. Then, illuminated images can be captured during the active/on portion of the light source's cycle.

By using a model of the illumination pattern of the light source, it is possible to predict where the gradient from illuminated to not-illuminated will occur within one or more camera images. By observing an object in a sequence of images as it crosses this illumination boundary, it is possible to determine whether the object is actively or passively illuminated.

For example, actively illuminated objects can both exceed a brightness threshold for illuminated objects when not within the illumination boundary and not change brightness greatly while within the illumination boundary, since they are already illuminated. Passively illuminated objects likely do not both exceed a brightness threshold for illuminated objects when not within the illumination boundary and may change brightness greatly while within the illumination boundary.

A change in brightness within the illumination boundary can depend on the reflectivity of the passively illuminated object, the light source generating the illumination, and on light generated by other sources of illumination, such as but not limited to lights of one or more other vehicles, street lights, and lights from nearby buildings. If a passively illuminated object does change brightness at the illumination boundary, the amount of change can indicate whether the object is highly reflective, such as a traffic sign, or not very reflective, such as a bridge column. For example, when the amount of change of brightness exceeds a brightness difference threshold, then the object can be considered to be highly reflective; otherwise, the object can be considered to be slightly reflective.

In some embodiments, a moving AV can take images while generating light via one or more light sources, such as headlights, tail lights, brake lights, etc. These images can include objects moving toward the AV, objects moving away from the AV, and objects moving at (about) the same speed as the AV. Some or all of these objects can be tracked from image to image to determine whether objects are not illuminated, passively illuminated, and/or actively illuminated. For example, a bicycle with reflectors and a head lamp can include: non-illuminated objects, such as components that do not reflect (much) light, passively-illuminated objects such as the reflectors, and actively-illuminated objects such as the head lamps.

The reflective surface of traffic signs can also be somewhat directional. A directional illumination pattern can be a distinctive partial illumination pattern that can distinguish traffic signs from other reflective objects. In certain scenarios, the geometry of the light source and reflective signs (or other objects) can lead to distinctive partial illumination patterns that change predictably over time. Upon detecting a partial illumination pattern, the AV can infer that a reflective sign (or other reflective object) generated the partial illumination pattern. For example, from a distance, the light sources of an AV can generate light that reflects off a reflective sign so that the reflective sign looks bright and fully illuminated. As the AV nears the reflective sign, the sign is partially in the light cone generated by the light source(s), leading to a partial illumination pattern of the sign, such as only a lower portion of the sign being visible.

Being able to detect various types of illuminated objects while moving, and in particular distinguishing traffic signs during night-time driving, can greatly aid an AV in operating and navigating in an autonomous-operation mode or in a partially-autonomous mode at night. Even while operating in a non-autonomous mode under control of a human driver, the AV can process images captured while moving to locate recently-seen illuminated objects, such as a recently passed traffic sign or traffic light, and present the recent images to the human driver to aid human driving. These techniques can be used to improve accuracy and safety in driving by both humans and vehicle control systems controlling AVs.

Example Operations

FIG. 1 is a flow chart of method 100, according to an example embodiment. Method 100 can be carried out by a computing device, such as computing device 660 described below in the context of at least FIGS. 6, 7, 8A, and 8B.

Method 100 begins at block 110, where a computing device can receive a sequence of images that includes a first image and a second image. The first image can be taken at a first time of an environment of a vehicle. The second image can be taken at a second time of the environment of the vehicle. The vehicle can include a light source operable to illuminate at least a portion of the environment. The first time can be different from the second time.

At block 120, the computing device can detect an object in the first image. The object can have a first size and a first brightness in the first image. In some embodiments, detecting the object in the first image can include: determining an illumination boundary of the light source in the first image; and detecting an illuminated object that is within the illumination boundary in the first image. In these embodiments, detecting the object in the second image can include: determining whether the illuminated object is in the first image; and in response to determining that the illuminated object is in the first image, detecting the illuminated object in the first image.

At block 130, the computing device can detect the object in the second image. The object can have a second size and a second brightness in the second image.

At block 140, the computing device can classify the object based on at least a brightness difference between the second brightness of the object and the first brightness of the object and a size difference between the second size of the object and the first size of the object. In some embodiments, classifying the object can include: classifying the object as an object moving toward the vehicle when the size difference exceeds a first predetermined size threshold, classifying the object as an object moving with the vehicle when the size difference is less than the first predetermined size threshold and greater than a second predetermined size threshold, and classifying the object as an object moving away from the vehicle when the size difference is less than the second predetermined size threshold.

In some embodiments, classifying the object can include classifying the object as a reflective object when the brightness difference exceeds a predetermined brightness threshold. In particular of these embodiments, after determining that the object is a reflective object, a determination can be made whether the brightness difference exceeds a high-reflectivity threshold. In response to determining that the brightness difference exceeds that high-reflectivity threshold, the object can be determined to be a highly reflective object. In response to determining that the brightness difference does not exceed the high-reflectivity threshold, the object can be determined to be a slightly reflective object.

In some embodiments, method 100 can also include: determining whether the brightness difference is less than a potentially-active threshold; in response to determining that the brightness difference is less than the potentially-active threshold, determining whether the first brightness exceeds an active-brightness threshold; and in response to determining that the first brightness exceeds the active-brightness threshold, classifying the object as an actively illuminated object.

In some embodiments, method 100 can also include: determining whether the object is associated with a traffic sign, based on at least the second image. In particular of these embodiments, determining whether the object is associated with a traffic sign can include: detecting a first illumination pattern in the first image for the object; detecting a second illumination pattern in the second image for the object; determining whether a sequence of illumination patterns is indicative of a traffic sign, where the sequence of illumination patterns includes the first illumination pattern and second illumination pattern, and in response to determining that the sequence of illumination patterns is indicative of a traffic sign, determining that the object is associated with the traffic sign. In some of these embodiments, at least one illumination pattern in the sequence of illumination patterns is a partial illumination pattern for the object.

In other particular of these embodiments, determining whether the object is associated with the traffic sign can include: performing character recognition on at least a portion of the second image associated with the object to determine text associated with the object; searching for the text associated with the object in a traffic-sign database storing texts of traffic signs; and, in response to finding the text associated with the reflective object in the traffic-sign database, determining that the object is associated with the traffic sign.

Example Images Obtained at Different Times

FIG. 2 shows images 200a, 200b taken by a stationary camera, according to an example embodiment. The stationary camera is mounted to a house (not seen) with a light source emitting light cone (LC) 230a in image 200a and light cone 230b in image 200b. Image 200a is taken at a time 206a of "22:21:59" (or 10:21:59 PM) and image 200b is taken two seconds later at a time 206b of "22:22:01" (or 10:22:01 PM). While taking images 200a, 200b, the stationary camera and the light source did not move. The two images can be one or more images taken at respective times 206a and 20b and/or one or more images selected at times 206a and 206b from a video.

Image 200a shows house 202a, vehicle 210a, and bicyclist 220a. House 202a has a lighted window, shown as light 204a in image 200a. Vehicle 210a is shown in image 200a with its headlights on and emitting LC 212a. Bicyclist 220a is shown with a head light on emitting LC 224a. In image 202a, bicyclist 220a is outside of LC 230a.

Image 200b shows house 202b, vehicles 210b, 214 and bicyclist 220b. House 202b has alighted window, shown as light 204b in image 200b. Vehicle 210b is shown in image 202b with its headlights on and emitting LC 212b. Bicyclist 220b is shown with a head light on emitting LC 224b. In image 202a, bicyclist 220b partially within LC 230b. As such, a reflector, such as reflective tape, attached to tire 222b, reflects light within LC 230b toward the stationary camera. The stationary camera receives the reflected light and shows the received reflected light as part of image 220b, by indicating that tire 222b has a bright circle of reflected light.

In comparing images 200a and 200b, house 202a and house 202b are shown in the same location and have the same size in both images. This lack of size and location difference indicates that the house did not move with respect to the stationary camera that captured images 200a and 200b.

Lights 204a and 204b are respectively shown has having the same size, location, and brightness in images 200a and 200b. The lack of size and location difference indicates that lights 204a, 204b did not move with respect to the stationary camera that captured images 200a and 200b. Also, as lights 204a, 204b have the same brightness in images 200a, 200b, lights 204a, 204b can be considered to be a static, or unchanging, light source at least with respect to images 200a, 200b.

Vehicle 210b in image 200b is shown as larger than vehicle 210a in image 200a. The increase in size of vehicle 210b in image 200b, relative to the size of vehicle 210a in image 200a, indicates that vehicle 210b is closer to the stationary camera at time 206b (22:22:01) than vehicle 210a was at time 206b (22:21:59). Also, vehicle 210b in image 200b is shown south of a position of vehicle 210a in image 200a, indicating that vehicle 210b moved closer to the stationary camera while moving from north to south.

Bicyclist 220b in image 200b is shown as being approximately the same size as bicyclist 220a in image 200a. The lack of change of size between bicyclist 220a in image 200a and bicyclist 220b in image 200b indicates that bicyclist 220a is about the same distance from the stationary camera at time 206b (22:22:01) and at time 206b (22:21:59). Also, bicyclist 220b in image 200b is shown east of a position of bicyclist 220a in image 200a, indicating that bicyclist 210b moved east to west while maintaining its distance from the stationary camera. Tire 222b of bicyclist 220b is shown as being both within LC 230b and considerably brighter in image 220b than in image 220a, where tire 222a is not shown in LC 230a. As such, a determination can be made that tire 222b has a reflective material that reflected light from the light source generating LC 230b.

Figure 3A:
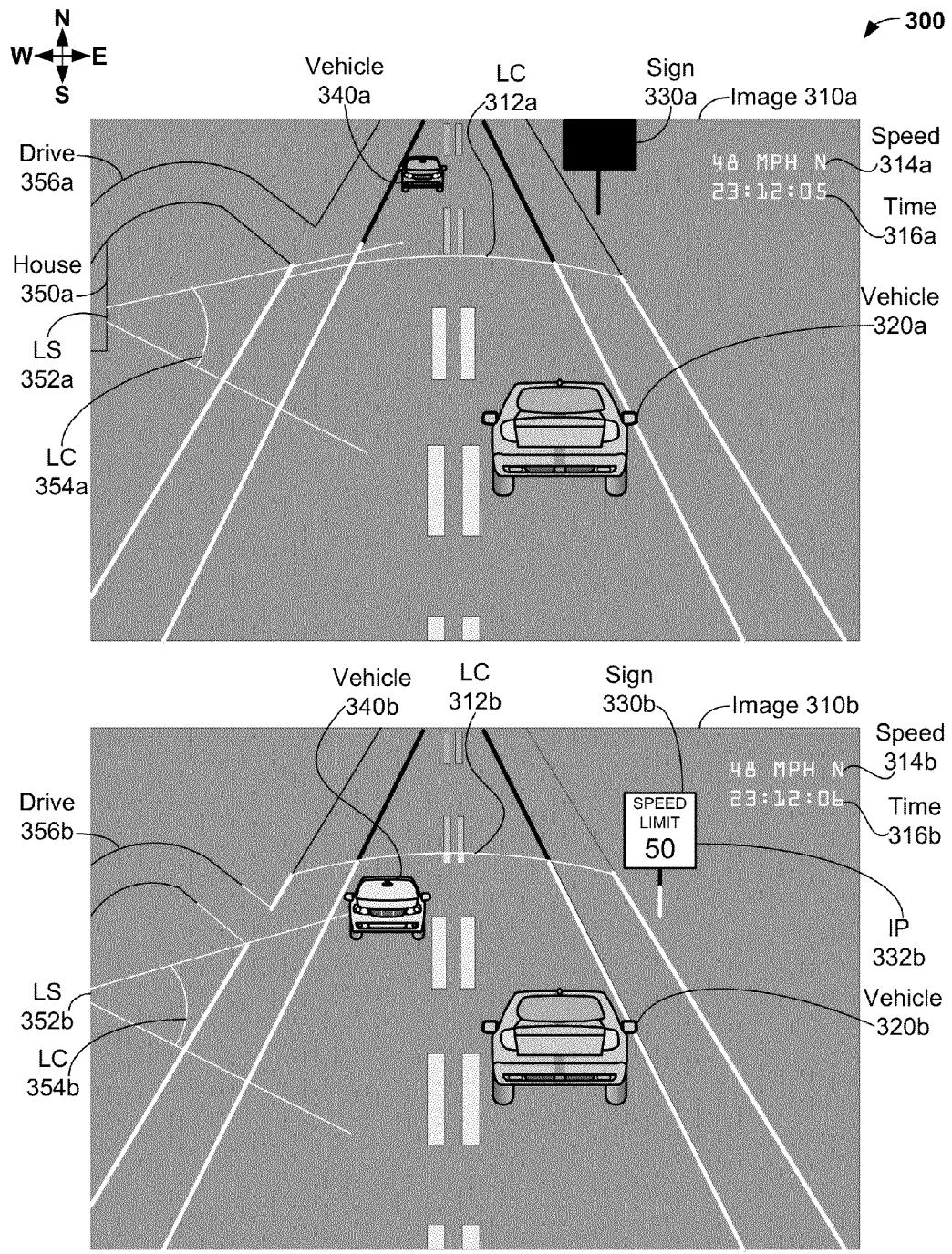
FIGS. 3A and 3B show a scenario where example images are taken by an autonomous vehicle, according to an example embodiment.
Figure 3B:
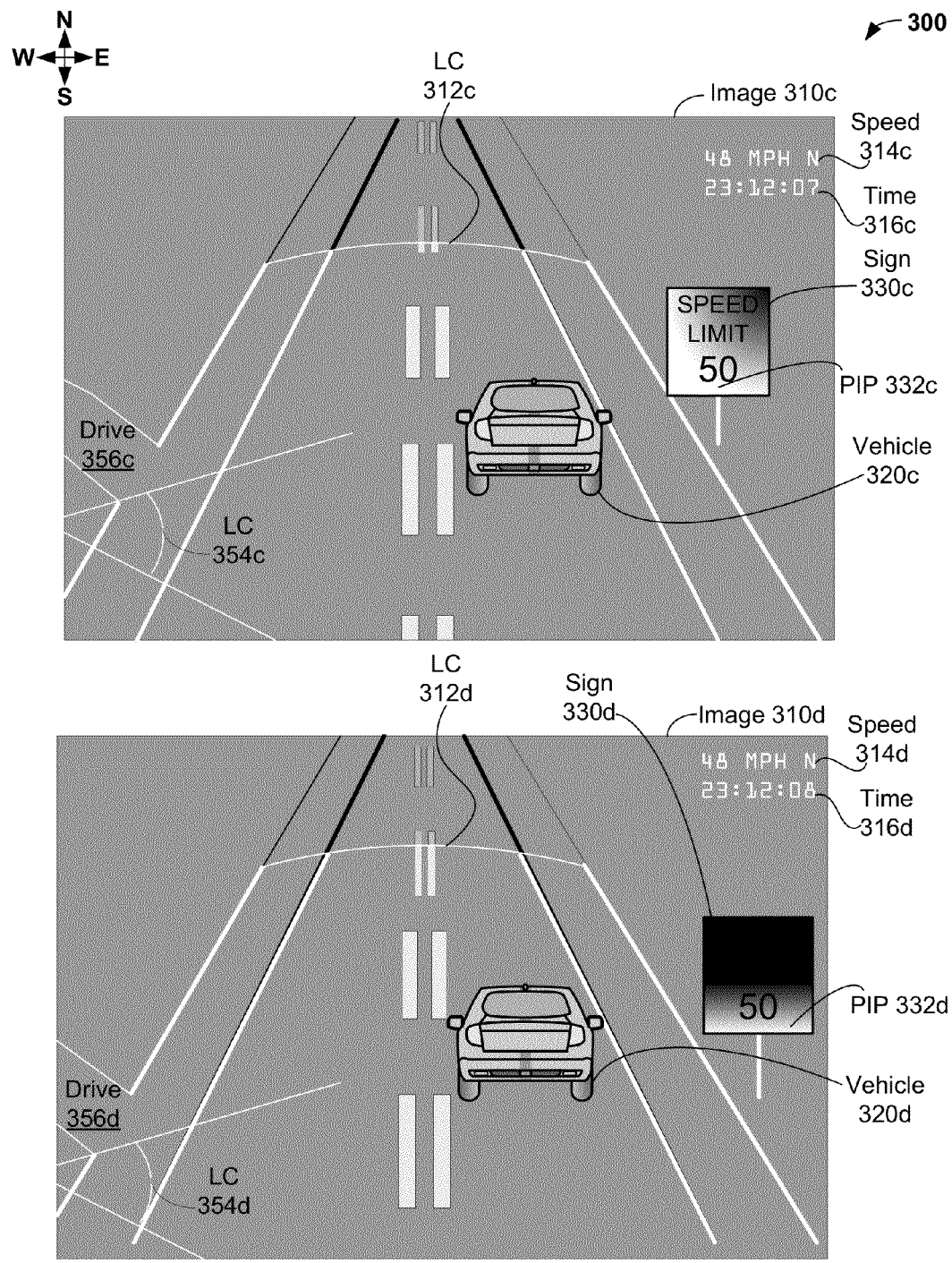

FIGS. 3A and 3B shows a scenario 300 where example images 310a, 310b, 310c, 310d are taken by a vehicle, not shown in the Figures, according to an example embodiment. FIG. 3A includes images 310a and 310b and FIG. 3B includes images 310c and 310d. In scenario 300, the vehicle capturing the images is an autonomous vehicle. To capture the images, the autonomous vehicle is configured with at least one still camera, video camera, and/or other image-storing/generating device. In scenario 300, the autonomous vehicle additionally is configured with one or more light sources that can operate to generate a light cone, shown as LC 312a in image 310a, LC312b in image 310b, LC312c in image 310c, and LC312d in image 310d.

Image 310a was taken while the vehicle was traveling at speed 314a of "48 MPH N", or 48 miles per hour heading north, at time 316a of "23:12:05", or 11:12:05 PM. Along with LC 312a, image 310 in FIG. 3A shows vehicles 320a, 340a, sign 330a, house 350a with a light source (LS) 352a configured to emit LC 354a, and drive 356a.

Scenario 300 continues with the autonomous vehicle moving north and then capturing another image after image 310a. Image 310b was taken while the autonomous vehicle was traveling at speed 314b of "48 MPH N", or 48 miles per hour heading north, at time 316b of "23:12:06", or 11:12:06 PM and emitting LC 312b. Along with LC 312b, image 310b shows vehicles 320b, 340b, sign 330b, light source (LS) 352b configured to emit LC 354b, and drive 356b.

In comparing images 310a and 310b, vehicle 320a and vehicle 320b are shown in the same relative location with respect to the autonomous vehicle and have the same size in both images. This lack of size and location difference indicates that vehicle 320a, 320b did not move with respect to the camera of the autonomous vehicle that captured images 300a and 300b. As images 310a, 310b both include speeds 314a, 314b indicating that the autonomous vehicle was northbound at 48 MPH, the autonomous vehicle can infer that that vehicle 320a, 320b is northbound at (approximately) 48 MPH. Further, lights associated with vehicle 320a, 320b, visible in respective images 310a, 310b, such as tail lights of vehicle 320a, 320b, can be considered to be unchanging light sources with respect to the autonomous vehicle.

Sign 330b is shown to be larger in image 310b of FIG. 3A than in image 310a. As sign 330b increased in size in image 310b with respect to image 310a, this infers that the autonomous vehicle was closer to sign 330a, 330b at time 316b of 23:12:06 than at time 316a of 23:12:05. Image 330b also shows that the light source(s) of the autonomous vehicle have illuminated sign 330b to generate illumination pattern 332b and to make visible sign wording of "SPEED LIMIT 50".

Sign 330b is shown to be larger in image 310b of FIG. 3A than in image 310a. As sign 330b increased in size in image 310b with respect to its size in image 310a, a computing device can infer that the autonomous vehicle was closer to sign 330a, 330b at time 316b of 23:12:06 than at time 316a of 23:12:05. Image 310b also shows that the light source(s) of the autonomous vehicle have illuminated sign 330b to generate illumination pattern 332b and to make visible sign wording of "SPEED LIMIT 50".

Vehicle 340b is shown to be larger in image 310b of FIG. 3A than in image 310a. As vehicle 340b has increased in size in image 310b with respect to its size in image 310a, a computing device, perhaps aboard the autonomous vehicle, can infer that the autonomous vehicle was closer to vehicle 340a, 340b at time 316b of 23:12:06 than at time 316a of 23:12:05. The computing device can compare images of a vehicle with static features, such as signs and landmarks, to determine whether or not the vehicle is moving relative to the static features. Image 310a shows that vehicle 340a is behind sign 330b and drive 356a, while image 310b shows vehicle 340b as being slightly ahead of sign 330b and the back of drive 356b, indicating that vehicle 340a, 340b is moving relative to sign 330a, 330b, and drive 356a, 356b.

Based on the inference that vehicle 340a, 340b is moving toward the autonomous vehicle and/or the determination that vehicle 340a, 340b is moving relative to static features, the computing device can determine that vehicle 340a, 340b is approaching the autonomous vehicle. In scenario 300, the computing device can determine vehicle 340a, 340b is moving southbound, as the autonomous vehicle is moving northbound. In some embodiments, the computing device can further determine a speed of vehicle 340a, 340b, perhaps based on the relative sizes of images of vehicle 340a, 340b within respective images 310a, 310b.

Scenario 300 continues with the autonomous vehicle maintaining north-bound movement and then capturing images 310c, 310d after capturing 310b. Image 310c of FIG. 3B was taken after the autonomous vehicle passed vehicle 340a, 340b. Image 310c indicates the autonomous vehicle was traveling at speed 314c of "48 MPH N", or 48 miles per hour heading north, at time 316c of "23:12:07", or 11:12:07 PM and emitting LC 312c. Along with LC 312c, image 310c shows vehicle 320c, sign 330c, LC 354b, and drive 356c.

Image 310d of FIG. 3D was taken after image 310c was captured. Image 310d indicates the autonomous vehicle was traveling at speed 314d of "48 MPH N", or 48 miles per hour heading north, at time 316d of "23:12:08", or 11:12:08 PM and emitting LC 312d. Along with LC 312d, image 310d shows vehicle 320d, sign 330d, LC 354d, and drive 356d.

A computing device can recognize that an object, such as sign 330c, 330d, is a traffic sign using the information in images 310c, 310d. FIG. 3B shows image 320c with partial illumination pattern (PIP) 332c of sign 330c with a darker region in the upper-right-hand side of sign 330c and a lighter region to a lower-left-hand side of sign 330c, as sign 330c is no longer completely within light cone LC 312c. FIG. 3B also shows image 320d, where the autonomous vehicle is closer to sign 330d than the autonomous vehicle was to sign 330c when image 320c was captured. As the autonomous vehicle is closer to sign 330d than to sign 330c, light cone 312d of image 310d illuminates less area of sign 330d than light cone 312c illuminates of sign 330d. As such, partial illumination pattern 332d is darker than partial illumination pattern 332c. More specifically, partial illumination pattern 332d indicates that only a small lower portion of sign 330d is illuminated by the autonomous vehicle.

Partial illumination patterns 332c, 332d can be compared to partial illumination patterns of illuminated traffic signs to determine that sign 330c, 332d is a traffic sign. In some cases, traffic signs made of reflective materials can reflect more light than non-reflective materials and/or reflect light in specific patterns, such as reflective materials used to outline letters and/or numbers on traffic signs. As such, one or more of partial illumination patterns 332c, 332d from sign 330c, 332d can be associated with traffic signs, and thus used to identify sign 330c, 330d as a traffic sign.

Additionally, a sequence of illumination and/or partial illumination patterns can be used to identify traffic signs. For example, a sequence of illumination patterns from a reflective object can first show the object as brightly illuminated first, while becoming darker as the autonomous vehicle approaches. This sequence of illumination patterns can be used to identify reflective objects, and in the context of images of roads, be used to identify the reflective objects as traffic signs.

Images 310b-310d show an example sequence of illumination patterns regarding at least sign 330b-330d. Sign 330b of image 310b is shown in FIG. 3A with an illumination pattern (IP) 332b indicating full illumination. Later captured image 310c of FIG. 3B includes partial illumination pattern 332c indicating that the autonomous vehicle has approached a reflective sign, sign 330c, as sign 330c appears larger in image 310c in comparison to sign 330b of image 310b. Partial illumination pattern 332c shows that a portion of sign 330c within light cone 312c is illuminated and reflecting light from the light sources of the autonomous vehicle. However, a portion of sign 330c outside of light cone 330c is shown as nearly or completely dark, indicating little or no light is reflected from sign 330c to be captured as part of image 330c.

Even later captured image 310d, shown in FIG. 3B, indicates that the autonomous vehicle has approached even closer to sign 330d, as sign 330d appears larger in image 310d compared to sign 330c in image 310c. Partial illumination pattern 332d shows that a relatively small portion of sign 330d is within light cone 312d and so is illuminated and reflecting light from the light sources of the autonomous vehicle. However, the larger portion of sign 330d is outside of light cone 330d and so is shown as nearly or completely dark, indicating little or no light is reflected from the larger portion of sign 330d.

As another example, the characters in sign 330b, 330c, 330d can be converted to text. For an example using image 310b of FIG. 1A, optical character recognition (OCR) can be performed on at least the portion of image 310b that contains sign 330b. The text of sign 330b, which in this example is "SPEED LIMIT 50" can then be compared to words in a traffic-sign database, or other data base, where the traffic-sign database stores texts of traffic signs. The texts of traffic signs can include words that often appear on traffic signs, such as "road construction", "speed limit", "yield", "stop", "school crossing", etc. In some cases, the traffic-sign database can store a traffic-sign identifier related to the text of a traffic sign; e.g., the text of a traffic sign "stop" can be associated with a traffic-sign identifier associated with stop signs. Then, the traffic sign can be both recognized as a traffic sign, by finding the text of the traffic sign in the traffic-sign database, and identified as a specific type of traffic sign, based on the traffic-sign identifier stored with the text of the traffic sign in the traffic-sign database. Then, using the traffic-sign, the computing device can determine that the object; e.g., sign 330b, is a traffic sign, and perhaps identify sign 330b as a speed limit sign. Other techniques for determining that an object is a traffic sign and/or identifying a type of the traffic sign are possible as well.

Example Techniques for Identifying Objects in Illuminated Images

An example technique to identify illuminated objects in a sequence of images is discussed below:

1. Capture part or all of an image I1 without any additional illumination. Let a pixel P1(x, y) in I1 be the pixel at location (x, y) in image I1.

2. Activate an illumination source that generates illumination with a known pattern, such as a cone of illumination.

3. While the illumination source is active, capture part or all of an image I2 of the same scene and the same size as image I1. Let P2(x, y) in I2 be the pixel value at location (x, y) in image I2.

4. Note that typical pixel values for greyscale images range from a minimum value of 0 (black) to a maximum value of 255 (white). In colored images, pixel values are often provided for three colors, such as red, green, and blue, with pixel values for each color ranging from a minimum value of 0 (black) to a maximum value of 255 (pure color). Determine a threshold pixel value T between the minimum and maximum pixel values. In some embodiments, T can be chosen as a threshold of a combination of pixel values; e.g., an average of red, green, and blue pixel values.

5. Generate a "threshold" image TI from I2 using threshold value T. Let TI(x, y) be the pixel at location (x, y) in TI. Let PP be a predetermined pixel, such as a black (minimum valued) pixel or white (maximum valued) pixel. Then, determine TI(x, y) by:
   a. If the P2(x, y) value meets or exceeds T, let TI(x, y)=P2(x, y).
   b. Otherwise P2(x, y) is less than T. Then, let TI(x, y)=PP.

6. Generate a difference image D by taking the pixel values from image I2 and subtracting the pixel values from image I1. That is, if D(x, y) is the pixel value of the image D at location (x, y), then determine D(x, y)=I2(x, y)–I1(x, y)

7. In some cases, generate a second difference image D2 by taking the pixel values from threshold image TI and subtracting the pixel values from difference image D. That is, if D1(x, y) is the pixel value of the image D at location (x, y), then determine D1(x, y)=TI(x, y)–D(x, y).

8. In some cases, I1 and I2 can be taken from different positions; e.g., when I1 and I2 are taken using a moving AV. In these cases, a mapping M(x1, y1)→(x2, y2) can be used to map pixels from a position (x1, y1) I1 to an equivalent position (x2, y2) in I2. Many other techniques other than pixel-based mappings can be used to locate and track objects captured in multiple images where objects and/or image-capturing devices, such as cameras, move between image captures, such as discussed above in the context of FIGS. 2 and 3.

Figure 4:
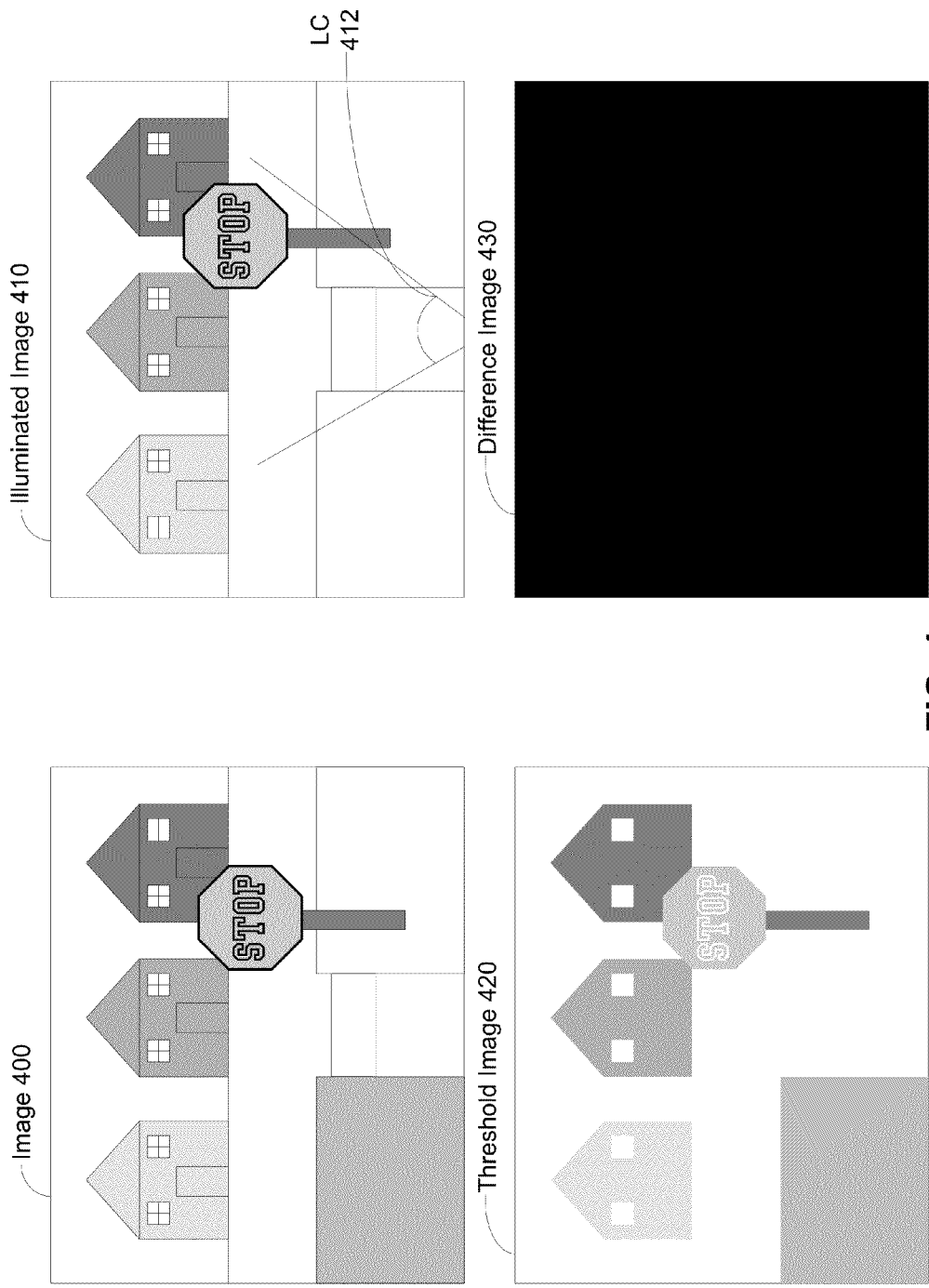
FIG. 4 shows example images related to an example technique to identify illuminated objects in a sequence of images, according to an example embodiment.

FIG. 4 shows images that illustrate this technique during daytime. Image 400, corresponding to image I1 in the example technique discussed above, can be captured without additional illumination. Then, a light source having light cone 412 can be activated and illuminated image 410 captured. In this example, the light source does not add any light for viewing the scene shown in images 400 and 410. Also in this example, T is set to a relatively high value; e.g., 240, which will only screen out black or nearly black pixels, and PP is set to low value corresponding to a black pixel. Then, threshold image 420 is almost the same as image 410, and difference image 430 is shown as a black image, indicating few if any differences between images 400 and 410.

Figure 5A:
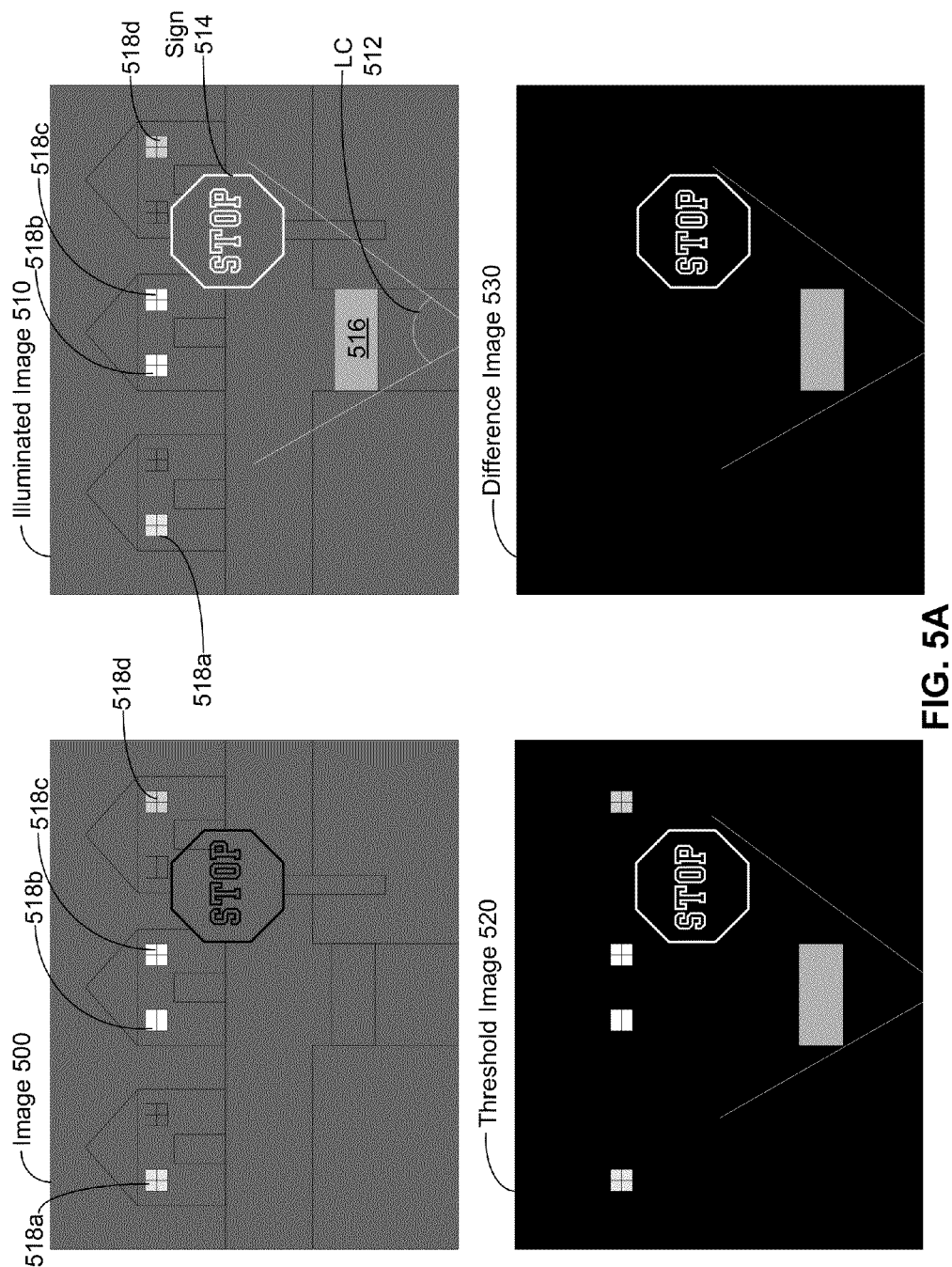
FIGS. 5A and 5B show additional example images related to an example technique to identify illuminated objects in a sequence of images, according to an example embodiment.

FIG. 5A shows images that illustrate this technique at night. Image 500, corresponding to image I1 in the example technique discussed above, can be captured without additional illumination. Image 500 shows active light sources 518a through 518d illuminated. Then, a light source having light cone 512 is activated and illuminated image 510 captured that includes light cone 512. Image 510 also shows active light sources 518a through 518d illuminated. In this example, the light source emitting light cone 512 adds light to the scene, causing reflected light from sign 514 and reflective paint in crosswalk 516 to be captured as part of illuminated image 510. Then, sign 514 and crosswalk 516 can be considered as passive light sources with respect to image 510. As with the previous example, T is set to a relatively high value which will only screen out black or nearly black pixels, and PP is set to a relatively low value corresponding to a black pixel. Then, threshold image 520 shows both the passively and actively illuminated portions of image 510, and difference image 530 shows the light from the light source, illustrated in FIG. 5A as a two lines specifying range 512, and light reflected from passive light sources 514 and 516.

Additional analysis can be performed on difference image 530 shown in FIG. 5A to determine that passive light source 514 is from a sign, such as discussed above in the context of FIGS. 3A and 3B.

Figure 5B:
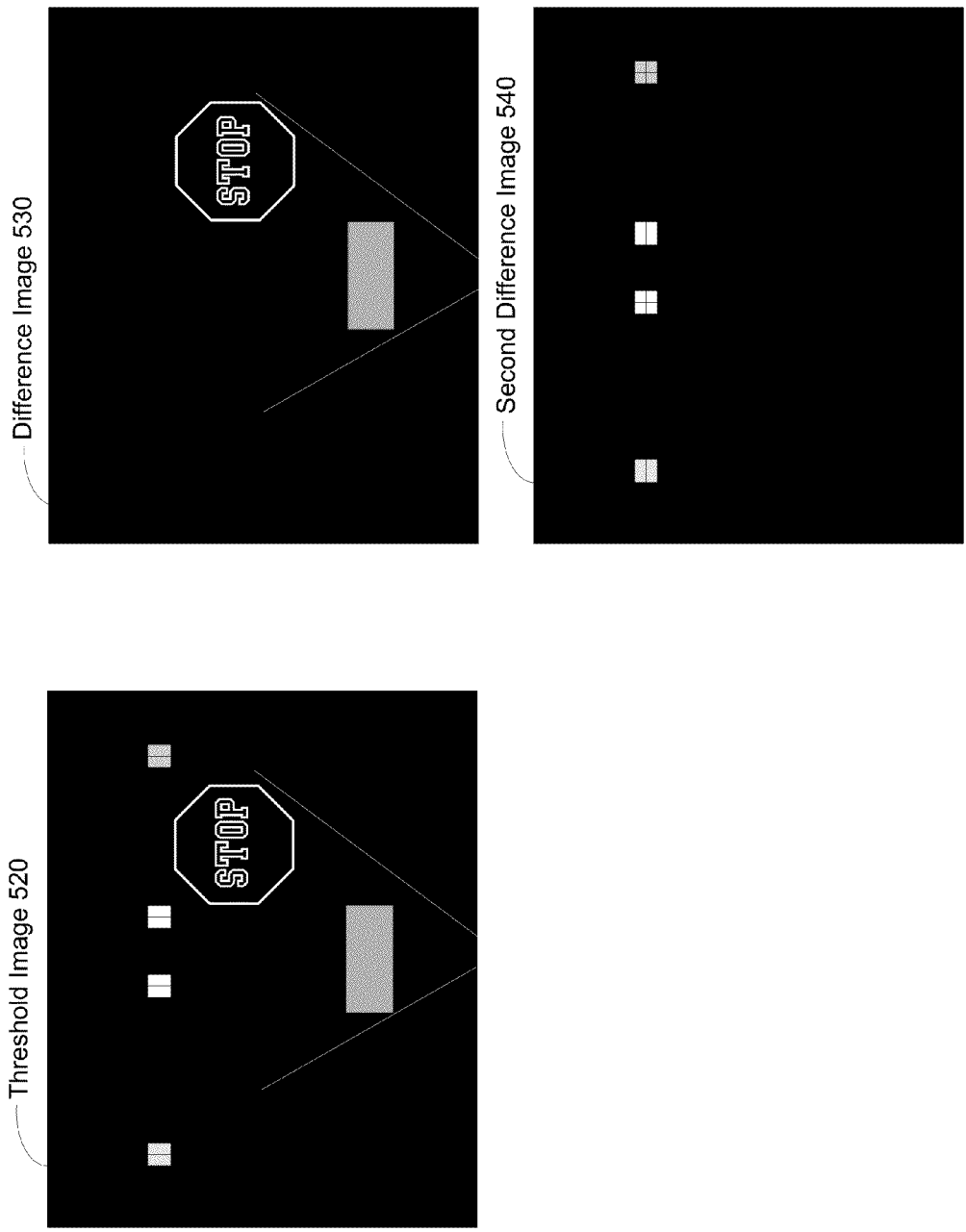

FIG. 5B shows second difference image 540 as a difference between threshold image 520 and difference image 530. As threshold image 520 includes light from all light sources, active and passive, and difference image 530 includes only light from the light source and light reflected from the light source; e.g., light from passive light sources 514 and 516. Thus, second difference image 540 is an image of light coming from active light sources, other than the light source used to generate illuminated image 510.

Example Vehicle Systems

Figure 6:
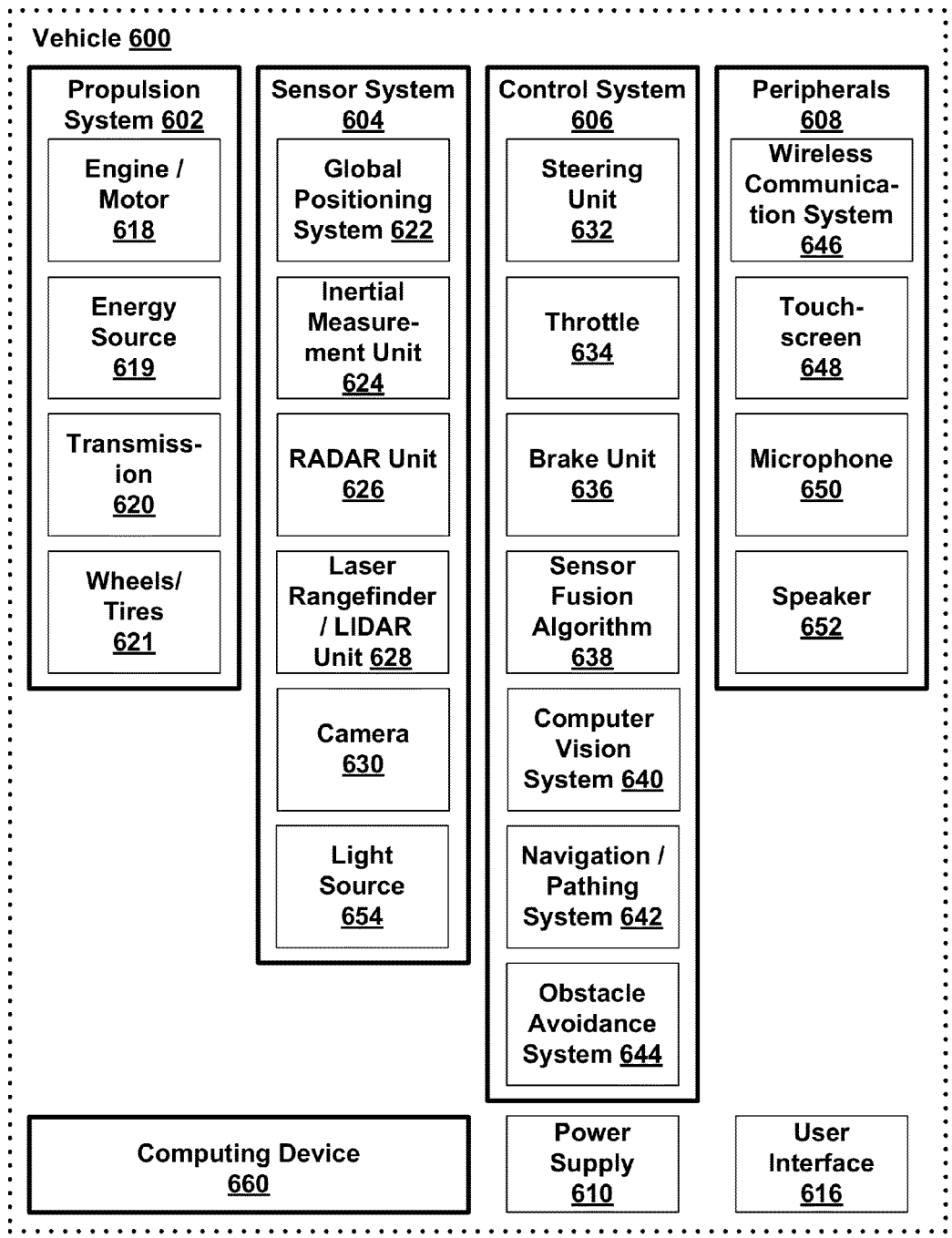
FIG. 6 is a functional block diagram illustrating a vehicle, according to an example embodiment.

FIG. 6 is a functional block diagram illustrating a vehicle 600, according to an example embodiment. The vehicle 600 can be configured to operate in an operational mode, such as a non-autonomous mode, a partially-autonomous mode, or an autonomous-operation mode. The non-autonomous mode can use human input to select and execute driving behaviors during operation of the vehicle. The partially-autonomous mode involves both a vehicle control system, such as control system 606 of vehicle 600, and human inputs to select driving behaviors during operation of the vehicle. For example, the vehicle control system can generate indications of driving behaviors for review by a human driver. For each indication, the human driver can review the indication and operate the vehicle by carrying out, modifying, or ignoring the indication. In some cases, the partially-autonomous mode can involve the autonomous vehicle performing all actions required to navigate and drive the vehicle, where a human drier can monitor the autonomous vehicle's performance and intervene if and when necessary; e.g., to avert an accident. Additional techniques for operating a vehicle in a partially-autonomous mode, such as auto-piloting and automatic parking, are possible as well.

In the autonomous-operation mode, the vehicle control system can select and execute driving behaviors along at least part of the route without human input. The autonomous-operation mode can be sub-divided into an autonomous mode utilizing a trained driver, an autonomous mode with a non-trained human driver, and an autonomous mode without a human driver. In autonomous-mode operation with a human driver, the vehicle control system can be configured to receive feedback from the human passenger about driving quality of the autonomous vehicle, and, in some circumstances, for the human driver to operate the vehicle.

The vehicle 600 can include various subsystems such as a propulsion system 602, a sensor system 604, a control system 606, one or more peripherals 608, as well as a power supply 610, a computing device 660, and a user interface 616. The vehicle 600 can include more or fewer subsystems and each subsystem can include multiple aspects. Further, each of the subsystems and aspects of vehicle 600 can be interconnected. Thus, one or more of the described functions of the vehicle 600 can be divided up into additional functional or physical components, or combined into fewer functional or physical components. In some further examples, additional functional and/or physical components can be added to the examples illustrated by FIG. 6.

The propulsion system 602 can include components operable to provide powered motion for the vehicle 600. In an example embodiment, the propulsion system 602 can include an engine/motor 618, an energy source 619, a transmission 620, and wheels/tires 621. The engine/motor 618 can be any combination of an internal combustion engine, an electric motor, steam engine, Stirling engine, or other types of engines and/or motors. In some embodiments, the engine/motor 618 can be configured to convert energy source 619 into mechanical energy. In some embodiments, the propulsion system 602 can include multiple types of engines and/or motors. For instance, a gas-electric hybrid car can include a gasoline engine and an electric motor. Other examples are possible.

The energy source 619 can represent a source of energy that can, in full or in part, power the engine/motor 618. That is, the engine/motor 618 can be configured to convert the energy source 619 into mechanical energy. Examples of energy sources 619 include gasoline, diesel, other petroleum-based fuels, propane, other compressed gas-based fuels, ethanol, solar panels, batteries, and other sources of electrical power. The energy source(s) 619 can additionally or alternatively include any combination of fuel tanks, batteries, capacitors, and/or flywheels. The energy source 619 can also provide energy for other systems of the vehicle 600.

The transmission 620 can include aspects that are operable to transmit mechanical power from the engine/motor 618 to the wheels/tires 621. To this end, the transmission 620 can include a gearbox, clutch, differential, and drive shafts. The transmission 620 can include other aspects. The drive shafts can include one or more axles that can be coupled to the one or more wheels/tires 621.

The wheels/tires 621 of vehicle 600 can be configured in various formats, including a unicycle, bicycle/motorcycle, tricycle, or car/truck four-wheel format. Other wheel/tire geometries are possible, such as those including six or more wheels. Any combination of the wheels/tires 621 of vehicle 600 can be operable to rotate differentially with respect to other wheels/tires 621. The wheels/tires 621 can represent at least one wheel that is fixedly attached to the transmission 620 and at least one tire coupled to a rim of the wheel that can make contact with the driving surface. The wheels/tires 621 can include any combination of metal and rubber, or another combination of materials.

The sensor system 604 can include a number of sensors configured to sense information about an environment of the vehicle 600. For example, the sensor system 604 can include a Global Positioning System (GPS) 622, an inertial measurement unit (IMU) 624, a RADAR unit 626, a laser rangefinder/LIDAR unit 628, a camera 630, and a light source 654. The sensor system 604 can also include sensors configured to monitor internal systems of the vehicle 600 (e.g., $O_2$ monitor, fuel gauge, engine oil temperature). Other sensors are possible as well.

One or more of the sensors included in sensor system 604 can be configured to be actuated separately and/or collectively in order to modify a position and/or an orientation of the one or more sensors.

The GPS 622 can be any sensor configured to estimate a geographic location of the vehicle 600. To this end, GPS 622 can include a transceiver operable to provide information regarding the position of the vehicle 600 with respect to the Earth.

The IMU 624 can include any combination of sensors (e.g., accelerometers and gyroscopes) configured to sense position and orientation changes of the vehicle 600 based on inertial acceleration.

The RADAR unit 626 can represent a system that utilizes radio signals to sense objects within the local environment of the vehicle 600. In some embodiments, in addition to sensing the objects, the RADAR unit 626 can additionally be configured to sense the speed and/or heading of the objects.

Similarly, the laser rangefinder or LIDAR unit 628 can be any sensor configured to sense objects in the environment in which the vehicle 600 is located using lasers. In an example embodiment, the laser rangefinder/LIDAR unit 628 can include one or more laser sources, a laser scanner, and one or more detectors, among other system components. The laser rangefinder/LIDAR unit 628 can be configured to operate in a coherent (e.g., using heterodyne detection) or an incoherent detection mode.

The camera 630 can include one or more devices configured to capture a plurality of images of the environment of the vehicle 600. The camera 630 can be a still camera or a video camera. Camera 630 can operate in conjunction with light source 654.

The light source 654 can generate and provide light to illuminate the environment of the vehicle 600, and can include, but is not limited to, one or more headlights, taillights, indicators, fog lights, light bulbs, halogen lights, light emitting diodes (LEDs), turn signals, beams, and lighting assemblies.

The control system 606 can be configured to control operation of the vehicle 600 and its components. Accordingly, the control system 606 can include various aspects include steering unit 632, throttle 634, brake unit 636, a sensor fusion algorithm 638, a computer vision system 640, a navigation/pathing system 642, and an obstacle avoidance system 644.

The steering unit 632 can represent any combination of mechanisms that can be operable to adjust the heading of vehicle 600.

The throttle 634 can be configured to control, for instance, the operating speed of the engine/motor 618 and, in turn, control the speed of the vehicle 600.

The brake unit 636 can include any combination of mechanisms configured to decelerate the vehicle 600. The brake unit 636 can use friction to slow the wheels/tires 621. In other embodiments, the brake unit 636 can convert the kinetic energy of the wheels/tires 621 to electric current. The brake unit 636 can take other forms as well.

The sensor fusion algorithm 638 can be an algorithm (or a computer program product storing an algorithm) configured to accept data from the sensor system 604 as an input. The data can include, for example, data representing information sensed at the sensors of the sensor system 604. The sensor fusion algorithm 638 can include, for instance, a Kalman filter, Bayesian network, or other algorithm. The sensor fusion algorithm 638 can further provide various assessments based on the data from sensor system 604. In an example embodiment, the assessments can include evaluations of individual objects and/or features in the environment of vehicle 600, evaluation of a particular situation, and/or evaluate possible impacts based on the particular situation. Other assessments are possible.

The computer vision system 640 can be any system operable to process and analyze images captured by camera 630 in order to identify objects and/or features in the environment of vehicle 600 that can include traffic signals, road way boundaries, and obstacles. The computer vision system 640 can use an object recognition algorithm, a Structure from Motion (SFM) algorithm, video tracking, and other computer vision techniques. In some embodiments, the computer vision system 640 can be additionally configured to map an environment, track objects, estimate the speed of objects, etc.

The navigation and pathing system 642 can be any system configured to determine a driving path for the vehicle 600. The navigation and pathing system 642 can additionally be configured to update the driving path dynamically while the vehicle 600 is in operation. In some embodiments, the navigation and pathing system 642 can be configured to incorporate data from the sensor fusion algorithm 638, the GPS 622, and one or more predetermined maps so as to determine the driving path for vehicle 600.

The obstacle avoidance system 644 can represent a control system configured to identify, evaluate, and avoid or otherwise negotiate potential obstacles in the environment of the vehicle 600.

The control system 606 can additionally or alternatively include components other than those shown and described.

Peripherals 608 can be configured to allow interaction between the vehicle 600 and external sensors, other vehicles, other computer systems, and/or a user. For example, peripherals 608 can include a wireless communication system 646, a touchscreen 648, a microphone 650, and/or a speaker 652.

In an example embodiment, the peripherals 608 can provide, for instance, means for a user of the vehicle 600 to interact with the user interface 616. To this end, the touchscreen 648 can provide information to a user of vehicle 600. The user interface 616 can also be operable to accept input from the user via the touchscreen 648. The touchscreen 648 can be configured to sense at least one of a position and a movement of a user's finger via capacitive sensing, resistance sensing, or a surface acoustic wave process, among other possibilities. The touchscreen 648 can be capable of sensing finger movement in a direction parallel or planar to the touchscreen surface, in a direction normal to the touchscreen surface, or both, and can also be capable of sensing a level of pressure applied to the touchscreen surface. The touchscreen 648 can be formed of one or more translucent or transparent insulating layers and one or more translucent or transparent conducting layers. The touchscreen 648 can take other forms as well.

In other instances, the peripherals 608 can provide means for the vehicle 600 to communicate with devices within its environment. The microphone 650 can be configured to receive audio (e.g., a voice command or other audio input) from a user of the vehicle 600. Similarly, the speakers 652 can be configured to output audio to the user of the vehicle 600.

In one example, the wireless communication system 646 can be configured to wirelessly communicate with one or more devices directly or via a communication network. For example, wireless communication system 646 can use 3G cellular communication, such as CDMA, EVDO, GSM/GPRS, or 4G cellular communication, such as WiMAX or LTE. Alternatively, wireless communication system 646 can communicate with a wireless local area network (WLAN), for example, using WiFi. In some embodiments, wireless communication system 646 can communicate directly with a device, for example, using an infrared link, Bluetooth, or ZigBee. Other wireless protocols, such as various vehicular communication systems, are possible within the context of the disclosure. For example, the wireless communication system 646 can include one or more dedicated short range communications (DSRC) devices that can include public and/or private data communications between vehicles and/or roadside stations.

The power supply 610 can provide power to various components of vehicle 600 and can represent, for example, a rechargeable lithium-ion or lead-acid battery. In some embodiments, one or more banks of such batteries can be configured to provide electrical power. Other power supply materials and configurations are possible. In some embodiments, the power supply 610 and energy source 619 can be implemented together, as in some all-electric cars.

Many or all of the functions of vehicle 600 can be controlled by a computing device 800, such as discussed in detail below with respect to FIG. 8A, or by multiple computing devices, such as discussed in detail below with respect to FIG. 8B.

The vehicle 600 can include a user interface 616 for providing information to or receiving input from a user of vehicle 600. The user interface 616 can control or enable control of content and/or the layout of interactive images that can be displayed on the touchscreen 648. Further, the user interface 616 can include one or more input/output devices within the set of peripherals 608, such as the wireless communication system 646, the touchscreen 648, the microphone 650, and the speaker 652.

The computing device 660 can control the function of the vehicle 600 based on inputs received from various subsystems (e.g., propulsion system 602, sensor system 604, and control system 606), as well as from the user interface 616. For example, the computing device 660 can utilize input from the control system 606 in order to control the steering unit 632 to avoid an obstacle detected by the sensor system 604 and the obstacle avoidance system 644. In an example embodiment, the computing device 660 can control many aspects of the vehicle 600 and its subsystems. In other embodiments, computing device 660 can be configured to carry out part or all of the herein-described methods; e.g., method 100 and/or perform some or all the autonomous vehicle applications described herein, and perhaps other autonomous vehicle applications; e.g., the above-disclosed enhanced navigation system, Meetup, and/or Day Trip application(s).

Although FIG. 6 shows various components of vehicle 600, i.e., wireless communication system 646 and computing device 660, as being integrated into the vehicle 600, one or more of these components can be mounted or associated separately from the vehicle 600. For example, computing device 660 can, in part or in full, exist separate from the vehicle 600. Thus, the vehicle 600 can be provided in the form of device aspects that can be located separately or together.

The device aspects that make up vehicle 600 can be communicatively coupled together in a wired and/or wireless fashion.

Figure 7:
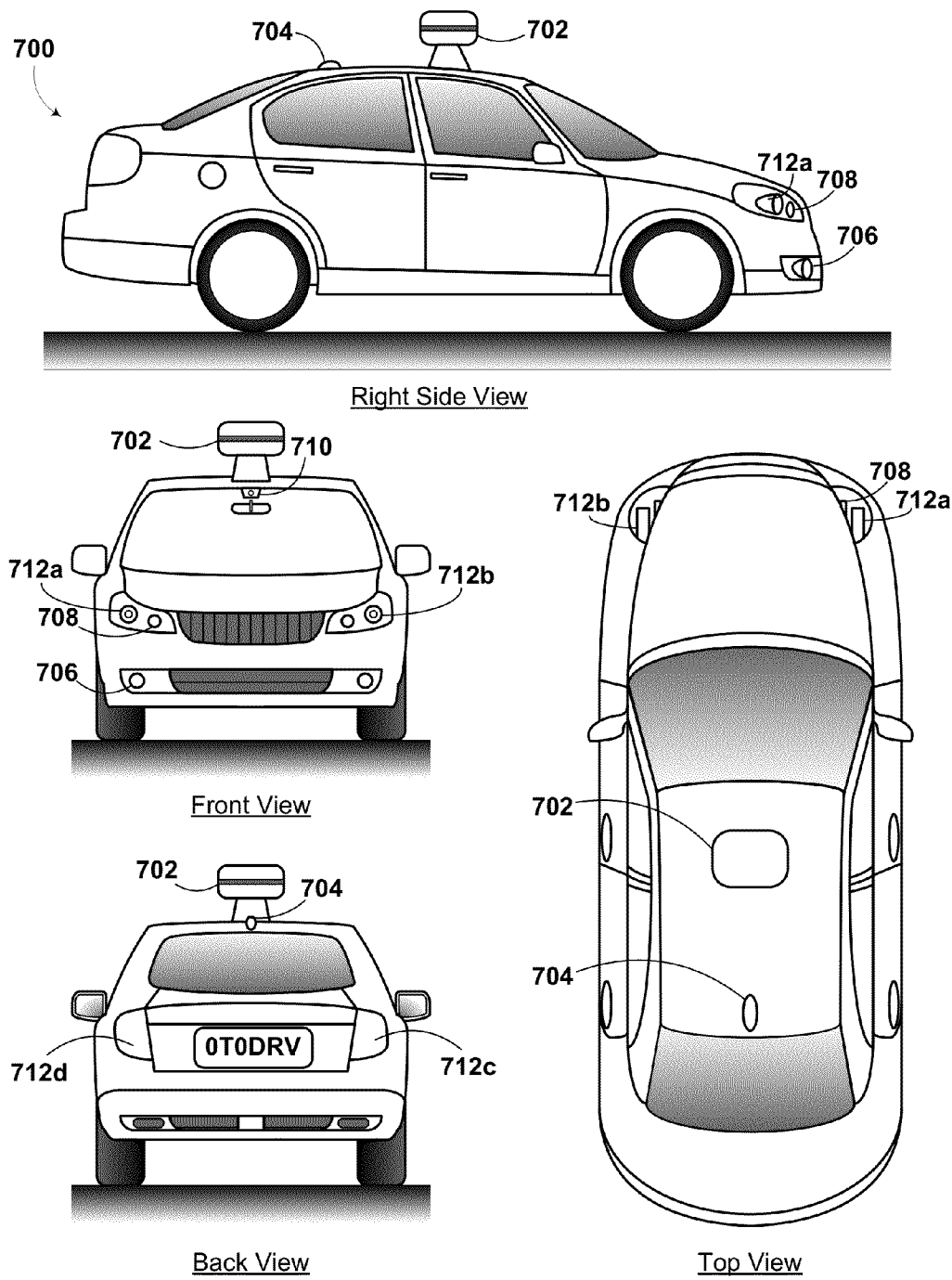
FIG. 7 shows a vehicle that can be similar or identical to the vehicle described with respect to FIG. 6, according to an example embodiment.

FIG. 7 shows a vehicle 700 that can be similar or identical to vehicle 600 described with respect to FIG. 6, in accordance with an example embodiment. Although vehicle 700 is illustrated in FIG. 7 as a car, other embodiments are possible. For instance, the vehicle 700 can represent a truck, a van, a semitrailer truck, a motorcycle, a golf cart, an off-road vehicle, or a farm vehicle, among other examples.

In some embodiments, vehicle 700 can include a sensor unit 702, a wireless communication system 704, a LIDAR unit 706, a laser rangefinder unit 708, a camera 710, and light sources 712*a*, 712*b*, 712*c*, 712*d*. The aspects of vehicle 700 can include some or all of the aspects described for FIG. 6.

The sensor unit 702 can include one or more different sensors configured to capture information about an environment of the vehicle 700. For example, sensor unit 702 can include any combination of cameras, RADARs, LIDARs, range finders, and acoustic sensors. Other types of sensors are possible. In an example embodiment, the sensor unit 702 can include one or more movable mounts that can be operable to adjust the orientation of one or more sensors in the sensor unit 702. In one embodiment, the movable mount can include a rotating platform that can scan sensors so as to obtain information from each direction around the vehicle 700. In another embodiment, the movable mount of the sensor unit 702 can be moveable in a scanning fashion within a particular range of angles and/or azimuths. The sensor unit 702 can be mounted atop the roof of a car, for instance, however other mounting locations are possible. Additionally, the sensors of sensor unit 702 can be distributed in different locations and need not be collocated in a single location. Some possible sensor types and mounting locations include LIDAR unit 706 and laser rangefinder unit 708. Furthermore, each sensor of sensor unit 702 can be configured to be moved or scanned independently of other sensors of sensor unit 702.

The wireless communication system 704 can be located on a roof of the vehicle 700 as depicted in FIG. 7. Alternatively, the wireless communication system 704 can be located, fully or in part, elsewhere. The wireless communication system 704 can include wireless transmitters and receivers that can be configured to communicate with devices external or internal to the vehicle 700. Specifically, the wireless communication system 704 can include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 710 can be any camera (e.g., a still camera, a video camera, etc.) configured to capture a plurality of images of the environment of the vehicle 700. To this end, the camera 710 can be configured to detect visible light, or can be configured to detect light from other portions of the spectrum, such as infrared or ultraviolet light. Other types of cameras are possible as well.

The camera 710 can be a two-dimensional detector, or can have a three-dimensional spatial range. In some embodiments, the camera 710 can be, for example, a range detector configured to generate a two-dimensional image indicating a distance from the camera 710 to a number of points in the environment. To this end, the camera 710 can use one or more range detecting techniques. For example, the camera 710 can use a structured light technique in which the vehicle 700 illuminates an object in the environment with a predetermined light pattern, such as a grid or checkerboard pattern and uses the camera 710 to detect a reflection of the predetermined light pattern off the object. Based on distortions in the reflected light pattern, the vehicle 700 can determine the distance to the points on the object. The predetermined light pattern can comprise infrared light, or light of another wavelength.

The camera 710 can be mounted inside a front windshield of the vehicle 700. Specifically, as illustrated, the camera 710 can capture images from a forward-looking view with respect to the vehicle 700. Other mounting locations and viewing angles of camera 710 are possible, either inside or outside the vehicle 700.

The camera 710 can have associated optics that can be operable to provide an adjustable field of view. Further, the camera 710 can be mounted to vehicle 700 with a movable mount that can be operable to vary a pointing angle of the camera 710. The camera 710 can operate in conjunction with one or more of light sources 712*a*, 712*b*, 712*c*, 712*d*.

Each of light sources 712*a*-712*d* can be a light source such as light source 654 discussed above in the context of FIG. 6. For example, each of light sources 712*a*, 712*b* is a head light. Each head light can be configured to generate and provide white or nearly white light and project the (nearly) white light in front of vehicle 700. As another example, each of light sources 712*c*, 712*d* is a tail light. Each tail light can be configured to generate and provide yellow, red, and/or white light behind vehicle 700. Other example light sources are possible as well, including but not limited to, additional light sources, light sources configured to provide different and/or additional colors of light, and light sources mounted in locations on vehicle 700 other than shown in FIG. 7.

Within the context of the present disclosure, the components of vehicle 600 and/or vehicle 700 can be configured to work in an interconnected fashion with other components within or outside their respective systems. For instance, the camera 630 can capture a plurality of images that can represent sensor data relating to an environment of the vehicle 600 operating in an autonomous mode. The environment can include another vehicle blocking a known traffic signal location ahead of the vehicle 600. Based on the plurality of images, an inference system (which can include computing device 660, sensor system 604, and control system 606) can infer that the unobservable traffic signal is red based on sensor data from other aspects of the environment (for instance images indicating the blocking vehicle's brake lights are on). Based on the inference, the computing device 660 and propulsion system 602 can act to control the vehicle 600.

Computing Device Architecture

Figure 8A:
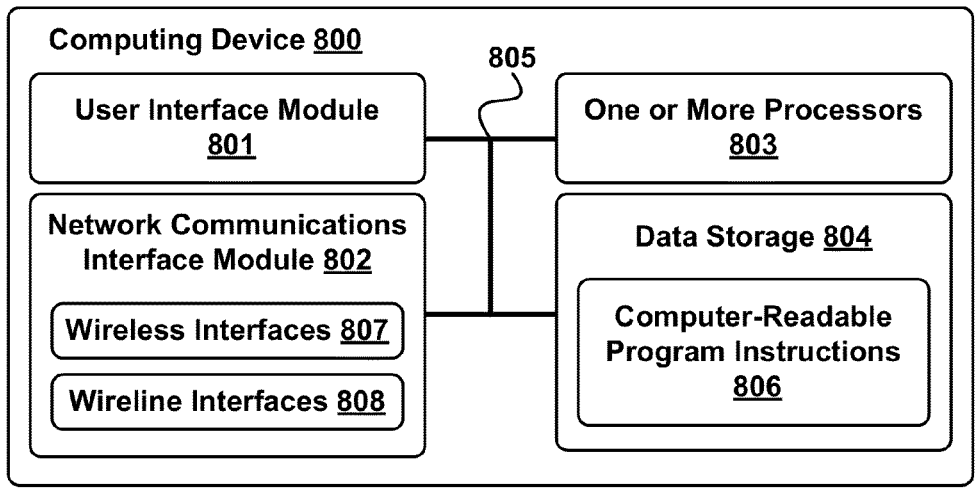
FIG. 8A is a block diagram of a computing device, according to an example embodiment.

FIG. 8A is a block diagram of computing device 800, in accordance with an example embodiment. Computing device 800 shown in FIG. 8A could be configured to perform one or more functions of computing device 660 and/or other functions. Computing device 800 may include a user interface module 801, a network-communication interface module 802, one or more processors 803, and data storage 804, all of which may be linked together via a system bus, network, or other connection mechanism 805.

User interface module 801 can be operable to send data to and/or receive data from external user input/output devices. For example, user interface module 801 can be configured to send and/or receive data to and/or from user input devices such as a keyboard, a keypad, a touch screen, a computer mouse, a track ball, a joystick, a camera, a voice recognition module, and/or other similar devices. User interface module 801 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 801 can also be configured to generate audible output(s), such as a speaker, speaker jack, audio output port, audio output device, earphones, and/or other similar devices.

Network-communications interface module 802 can include one or more wireless interfaces 807 and/or one or more wireline interfaces 808 that are configurable to communicate via a network. Wireless interfaces 807 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 802 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 803 can include one or more general purpose processors and/or one or more special purpose processors (e.g., digital signal processors, application specific integrated circuits, etc.). Processors 803 can be configured to execute computer-readable program instructions 806 that are contained in the data storage 804 and/or other instructions as described herein.

Data storage 804 can include one or more computer-readable storage media that can be read and/or accessed by at least one of processors 803. The one or more computer-readable storage media can include volatile and/or non-volatile storage components, such as optical, magnetic, organic or other memory or disc storage, which can be integrated in whole or in part with at least one of processors 803. In some embodiments, data storage 804 can be implemented using a single physical device (e.g., one optical, magnetic, organic or other memory or disc storage unit), while in other embodiments, data storage 804 can be implemented using two or more physical devices.

Data storage 804 can include computer-readable program instructions 806, and perhaps additional data. In some embodiments, data storage 804 can additionally include storage required to perform at least part of the herein-described methods and techniques and/or at least part of the functionality of the herein-described devices and networks.

Cloud-Based Servers

Figure 8B:
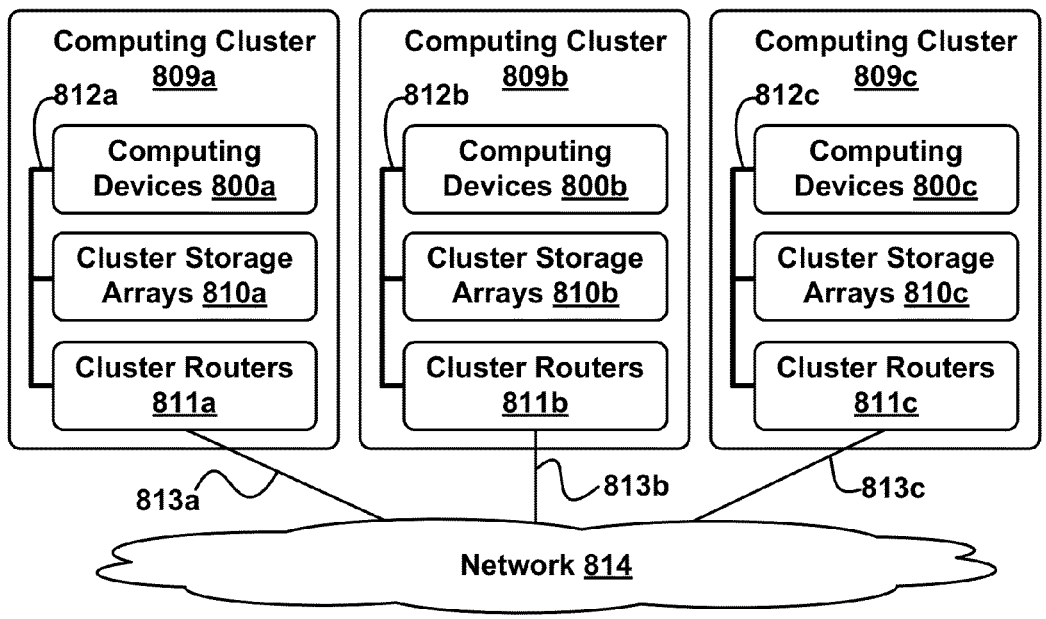
FIG. 8B depicts a network of computing clusters arranged as a cloud-based server system, according to an example embodiment.

FIG. 8B depicts a network 814 of computing clusters 809*a*, 809*b*, 809*c* arranged as a cloud-based server system, in accordance with an example embodiment. Computing device 660 can be a cloud-based device that stores program logic and/or data of cloud-based applications and/or services. In some embodiments, computing device 660 can be a single computing device residing in a single computing center; e.g., within vehicle 600. In other embodiments, computing device 660 can include multiple computing devices in a single computing center, or even multiple computing devices located in multiple computing centers located in diverse geographic locations.

In some embodiments, data and services at computing device 660 can be encoded as computer readable information stored in non-transitory, tangible computer readable media (or computer readable storage media) and accessible by programmable devices, such as mobile devices, laptop or desktop computers, smart phones, and/or other computing devices. In some embodiments, data at computing device 660 can be stored on a single disk drive or other tangible storage media, or can be implemented on multiple disk drives or other tangible storage media located at one or more diverse geographic locations.

FIG. 8B depicts a cloud-based server system in accordance with an example embodiment. In FIG. 8B, the functions of computing device 660 can be distributed among three computing clusters 809*a*, 809*b*, and 809*c*. Computing cluster 809*a* can include one or more computing devices 800*a*, cluster storage arrays 810*a*, and cluster routers 811*a* connected by a local cluster network 812*a*. Similarly, computing cluster 809*b* can include one or more computing devices 800*b*, cluster storage arrays 810*b*, and cluster routers 811*b* connected by a local cluster network 812*b*. Likewise, computing cluster 809*c* can include one or more computing devices 800*c*, cluster storage arrays 810*c*, and cluster routers 811*c* connected by a local cluster network 812*c*.

In some embodiments, each of the computing clusters 809*a*, 809*b*, and 809*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 809*a*, for example, computing devices 800*a* can be configured to perform various computing tasks of computing device 660. In one embodiment, the various functionalities of computing device 660 can be distributed among one or more of computing devices 800*a*, 800*b*, and 800*c*. Computing devices 800*b* and 800*c* in computing clusters 809*b* and 809*c* can be configured similarly to computing devices 800*a* in computing cluster 809*a*. On the other hand, in some embodiments, computing devices 800*a*, 800*b*, and 800*c* can be configured to perform different functions.

In some embodiments, computing tasks and stored data associated with computing device 660 can be distributed across computing devices 800*a*, 800*b*, and 800*c* based at least in part on the processing requirements of computing device 660, the processing capabilities of computing devices 800*a*, 800*b*, and 800*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 810*a*, 810*b*, and 810*c* of the computing clusters 809*a*, 809*b*, and 809*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of computing device 660 can be distributed across computing devices 800a, 800b, and 800c of computing clusters 809a, 809b, and 809c, various active portions and/or backup portions of these components can be distributed across cluster storage arrays 810a, 810b, and 810c. For example, some cluster storage arrays can be configured to store the data of one or more computing devices 660, while other cluster storage arrays can store data of other computing device(s) 660. Additionally, some cluster storage arrays can be configured to store backup versions of data stored in other cluster storage arrays.

The cluster routers 811a, 811b, and 811c in computing clusters 809a, 809b, and 809c can include networking equipment configured to provide internal and external communications for the computing clusters. For example, the cluster routers 811a in computing cluster 809a can include one or more internet switching and routing devices configured to provide (i) local area network communications between the computing devices 800a and the cluster storage arrays 801a via the local cluster network 812a, and (ii) wide area network communications between the computing cluster 809a and the computing clusters 809b and 809c via the wide area network connection 813a to network 814. Cluster routers 811b and 811c can include network equipment similar to the cluster routers 811a, and cluster routers 811b and 811 c can perform similar networking functions for computing clusters 809b and 809b that cluster routers 811a perform for computing cluster 809a.

In some embodiments, the configuration of the cluster routers 811a, 811b, and 811c can be based at least in part on the data communication requirements of the computing devices and cluster storage arrays, the data communications capabilities of the network equipment in the cluster routers 811a, 811b, and 811c, the latency and throughput of local networks 812a, 812b, 812c, the latency, throughput, and cost of wide area network links 813a, 813b, and 813c, and/or other factors that can contribute to the cost, speed, fault-tolerance, resiliency, efficiency and/or other design goals of the moderation system architecture.

Conclusion

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A method, comprising:
receiving, by a computing device, a sequence of images comprising a first image and a second image, wherein the first image is taken at a first time of an environment of a vehicle, wherein the second image is taken at a second time of the environment of the vehicle, wherein the vehicle comprises a light source operable to illuminate a portion of the environment within an illumination boundary, and wherein the first time is different from the second time;

detecting, by the computing device, an object in the first image, wherein the object has a first size and a first brightness in the first image, and wherein the object is not within the illumination boundary in the first image;

detecting, by the computing device, the object in the second image, wherein the object has a second size and a second brightness in the second image, and wherein the object is within the illumination boundary in the second image; and classifying the object, by the computing device, wherein classifying the object comprises classifying the object as one of an actively illuminated object or a passively illuminated object based on at least the first brightness of the object when the object is not within the illumination boundary and the second brightness of the object when the object is within the illumination boundary.

2. The method of claim 1, further comprising determining a size difference between the second size of the object and the first size of the object, wherein classifying the object further comprises:

classifying the object as an object moving toward the vehicle when the size difference exceeds a first predetermined size threshold;

classifying the object as an object moving with the vehicle when the size difference is less than the first predetermined size threshold and greater than a second predetermined size threshold; and classifying the object as an object moving away from the vehicle when the size difference is less than the second predetermined size threshold.

3. The method of claim 1, wherein classifying the object comprises classifying the object as a passively illuminated object when the second brightness of the object is greater than the first brightness of the object.

4. The method of claim 1, further comprising:

determining a brightness difference between the second brightness of the object and the first brightness of the object;

determining whether the brightness difference exceeds a high-reflectivity threshold, in response to determining that the brightness difference exceeds the high-reflectivity threshold, determining that the object is a highly reflective object, and in response to determining that the brightness difference does not exceed the high-reflectivity threshold, determining that the object is a slightly reflective object.

5. The method of claim 1, further comprising:

determining a brightness difference between the second brightness of the object and the first brightness of the object;

determining whether the brightness difference is less than a potentially-active threshold;

in response to determining that the brightness difference is less than the potentially-active threshold, determining whether the first brightness exceeds an active-brightness threshold; and in response to determining that the first brightness exceeds the active-brightness threshold, classifying the object as an actively illuminated object.

6. The method of claim 1, wherein classifying the object further comprises determining whether the object is associated with a traffic sign.

7. The method of claim 6, wherein determining whether the object is associated with the traffic sign comprises:

detecting a first illumination pattern in the first image for the object;

detecting a second illumination pattern in the second image for the object;

determining whether a sequence of illumination patterns is indicative of a traffic sign, wherein the sequence of illumination patterns comprises the first illumination pattern and second illumination pattern; and in response to determining that the sequence of illumination patterns is indicative of a traffic sign, determining that the object is associated with the traffic sign.

8. The method of claim 7, wherein at least one illumination pattern in the sequence of illumination patterns is a partial illumination pattern.

9. The method of claim 6, wherein determining whether the object is associated with the traffic sign comprises:

performing character recognition on at least a portion of the second image associated with the object to determine text associated with the object;

searching for the text associated with the object in a traffic-sign database storing texts of traffic signs; and in response to finding the text associated with the object in the traffic-sign database, determining that the object is associated with the traffic sign.

10. A device including a computer-readable storage medium having stored thereon program instructions that, upon execution by a computing device, cause the computing device to perform operations comprising:

receiving a sequence of images comprising a first image and a second image, wherein the first image is taken at a first time of an environment of a vehicle, wherein the second image is taken at a second time of the environment of the vehicle, wherein the vehicle comprises a light source operable to illuminate a portion of the environment within an illumination boundary, and wherein the first time is different from the second time;

detecting an object in the first image, wherein the object has a first size and a first brightness in the first image, and wherein the object is not within the illumination boundary in the first image;

detecting the object in the second image, wherein the object has a second size and a second brightness in the second image, and wherein the object is within the illumination boundary in the second image; and classifying the object, wherein classifying the object comprises classifying the object as one of an actively illuminated object or a passively illuminated objected based on at least the first brightness of the object when the object is not within the illumination boundary and the second brightness of the object when the object is within the illumination boundary.

11. The device of claim 10, further comprising determining a size difference between the second size of the object and the first size of the object, wherein classifying the object further comprises:

classifying the object as an object moving toward the vehicle when the size difference exceeds a first predetermined size threshold;

classifying the object as an object moving with the vehicle when the size difference is less than the first predetermined size threshold and greater than a second predetermined size threshold; and classifying the object as an object moving away from the vehicle when the size difference is less than the second predetermined size threshold.

12. The device of claim 10, wherein classifying the object comprises classifying the object as a passively reflective object when the second brightness of the object is greater than the first brightness of the object.

13. The device of claim 10, the operations further comprising:
- determining a brightness difference between the second brightness of the object and the first brightness of the object;
- determining whether the brightness difference exceeds a high-reflectivity threshold,
- in response to determining that the brightness difference exceeds the high-reflectivity threshold, determining that the object is a highly reflective object, and
- in response to determining that the brightness difference does not exceed the high-reflectivity threshold, determining that the object is a slightly reflective object.

14. The device of claim 10, the operations further comprising:
- determining a brightness difference between the second brightness of the object and the first brightness of the object;
- determining whether the brightness difference is less than a potentially-active threshold;
- in response to determining that the difference is less than the potentially-active threshold, determining whether the first brightness exceeds an active-brightness threshold; and
- in response to determining that the first brightness exceeds the active-brightness threshold, classifying the object as an actively illuminated object.

15. The device of claim 10, wherein classifying the object further comprises determining whether the object is associated with a traffic sign, based on at least the second image.

16. The device of claim 15, wherein determining whether the object is associated with a traffic sign comprises:
- detecting a first illumination pattern in the first image for the object;
- detecting a second illumination pattern in the second image for the object;
- determining whether a sequence of illumination patterns is indicative of a traffic sign, wherein the sequence of illumination patterns comprises the first illumination pattern and second illumination pattern; and
- in response to determining that the sequence of illumination patterns is indicative of a traffic sign, determining that the object is associated with the traffic sign.

17. The device of claim 15, wherein determining whether the object is associated with a traffic sign comprises:
- performing character recognition on at least a portion of the second image associated with the object to determine text associated with the object;
- searching for the text associated with the object in a traffic-sign database storing texts of traffic signs; and
- in response to finding the text associated with the object in the traffic-sign database, determining that the object is associated with the traffic sign.

18. A computing device, comprising:
a processor; and
a non-transitory computer-readable storage medium, storing instructions thereon that, when executed by the processor, cause the computing device to perform operations, comprising:
- receiving a sequence of images comprising a first image and a second image, wherein the first image is taken at a first time of an environment of a vehicle, wherein the second image is taken at a second time of the environment of the vehicle, wherein the vehicle comprises a light source operable to illuminate a portion of the environment within an illumination boundary, and wherein the first time is different from the second time,
- detecting an object in the first image, wherein the object has a first size and a first brightness in the first image, and wherein the object is not within the illumination boundary in the first image,
- detecting the object in the second image, wherein the object has a second size and a second brightness in the second image, and wherein the object is within the illumination boundary in the second image, and
- classifying the object, wherein the classifying the object comprises classifying the object as one of an actively illuminated object or a passively illuminated object based on at least the first brightness of the object when the object is not within the illumination boundary and the second brightness of the object when the object is within the illumination boundary.

19. The computing device of claim 18, further comprising determining a size difference between the second size of the object and the first size of the object, wherein classifying the object further comprises:
- classifying the object as an object moving toward the vehicle when the size difference exceeds a first predetermined size threshold;
- classifying the object as an object moving with the vehicle is the size difference is less than the first predetermined size threshold and greater than a second predetermined size threshold; and
- classifying the object as an object moving away from the vehicle is the size difference is less than the second predetermined size threshold.

20. The computing device of claim 18, wherein the operation of classifying the object comprises classifying the object as a passively illuminated object when the second brightness of the object is greater than the first brightness of the object.

21. The computing device of claim 18, the operations further comprising:
- determining a brightness difference between the second brightness of the object and the first brightness of the object;
- determining whether the difference exceeds a high-reflectivity threshold,
- in response to determining that the difference exceeds the high-reflectivity threshold, determining that the object is a highly reflective object, and
- in response to determining that the difference does not exceed the high-reflectivity threshold, determining that the object is a slightly reflective object.

22. The computing device of claim 18, the operations further comprising:
- determining a brightness difference between the second brightness of the object and the first brightness of the object;
- determining whether the brightness difference is less than a potentially-active threshold;
- in response to determining that the difference is less than the potentially-active threshold, determining whether the first brightness exceeds an active-brightness threshold; and
- in response to determining that the first brightness exceeds the active-brightness threshold, classifying the object as an actively illuminated object.

23. The computing device of claim 18, wherein classifying the object further comprises determining whether the object is associated with a traffic sign, based on the first and second images.

* * * * *